(12) United States Patent
De Martino

(10) Patent No.: US 6,707,195 B1
(45) Date of Patent: Mar. 16, 2004

(54) ANTI-DEFLAGRATING OPERATING ACTUATOR

(75) Inventor: Bernardino De Martino, Seriate (IT)

(73) Assignee: Edelweiss Italia S.r.l., Zanica (IT)

( * ) Notice: Subject to any disclaimer, the term of this patent is extended or adjusted under 35 U.S.C. 154(b) by 0 days.

(21) Appl. No.: 09/807,510

(22) PCT Filed: Jul. 27, 2000

(86) PCT No.: PCT/IT00/00318

§ 371 (c)(1), (2), (4) Date: Apr. 16, 2001

(87) PCT Pub. No.: WO01/15303

PCT Pub. Date: Mar. 1, 2001

(30) Foreign Application Priority Data

Aug. 19, 1999 (IT) .......................................... T099A0719

(51) Int. Cl.[7] ................................................. H02K 5/10
(52) U.S. Cl. ........................................... 310/88; 310/89
(58) Field of Search ................................ 310/85, 88, 89

(56) References Cited

U.S. PATENT DOCUMENTS

| | | | | |
|---|---|---|---|---|
| 2,642,077 A | * | 6/1953 | Waterman | 137/115.1 |
| 3,325,659 A | | 6/1967 | Douglas | 310/50 |
| 4,260,918 A | * | 4/1981 | Engle | 310/68 B |
| 4,668,146 A | * | 5/1987 | Ageta | 310/112 |
| 5,192,194 A | * | 3/1993 | Birdwell | 310/88 |

FOREIGN PATENT DOCUMENTS

| | | |
|---|---|---|
| GB | 2 230 392 | 10/1990 |
| GB | 2 251 790 | 7/1992 |
| GB | 2 303972 | 5/1997 |

\* cited by examiner

*Primary Examiner*—Dang Le
(74) *Attorney, Agent, or Firm*—Finnegan, Henderson, Farabow, Garrett & Dunner, LLP

(57) ABSTRACT

An anti-deflagrating actuator adapted to operate in an explosion risk environment includes an external power source and internal components such as a gear reducer, and one of a motion transmission mechanism and a mechanism for transforming rotary motion into linear motion. The internal components are integrally protected within an external housing having a uniform area of free volume that is formed in a shape that outlines the internal components. The actuator further includes a plurality of outlets for connecting electrical power and other control connections received from external sources. These outlets are positioned on the external housing so that they prevent, among other things, kinking of the wiring, which can impair wiring resistance.

2 Claims, 2 Drawing Sheets

ANTI-DEFLAGRATING OPERATING ACTUATOR

BACKGROUND

1. Field

The present invention refers to an actuator adapted to operate in environments having a combustible atmosphere such that special precautions are required when using electric, pneumatic, or mechanical devices.

2. Related Art

In an environment with explosion risks, an actuator must be able to withstand the explosion force that is characteristic for any given gas or mixture according to the degree of risk associated with the type of atmosphere in which the actuator itself operates.

Conventional methods provide several deflagration-protecting procedures for providing an actuator, where each procedure aims to insulate actuator components that are prone to explode. In some cases, deflagration protection is realized by encapsulating critical actuator parts in a suitable vessel. The suitable vessel is further equipped with outlets for connecting mechanical parts that are used for the connection of mechanical parts that transit mechanical power and outlets used for connecting at least one of an electric supply and control connections.

The geometric shape of the vessel, the volume ratio occupied by the internal components with respect to the internal volume of the housing containing them, and the degree of uniformity of the free volume are some of the design variables whose optimisation affects both the static response and the dynamic response of the actuator to an explosion. With respect to a possible detonation phenomenon, it is good practice to keep the free volume uniform inside the vessel, thereby avoiding the occurrence of precompression phenomena that follows detonation. Generally, however, this practice allows realization of a device that is scarcely appreciated because of excessive overall dimensions that impair placing the device in locations having limited available space.

SUMMARY

An object of the present invention is to solve the above prior-art problems by providing an anti-deflagrating operating actuator, adapted to operate in an environment that is classified—according to the existing standards, as having a maximum explosion risk. An actuator as such comprises the following:

- components supplied with an electric voltage, a gear reducer, and at least one of a motion transmitting mechanism and a mechanism transforming the motion from rotary to linear, are integrally protected against deflagration;
- an external housing that optimally protects the apparata contained therein, and is formed such that the shape of the housing outlines the internal parts, guarantees final reduced volume and weight, keeps an internal five volume uniform, and guarantees to reduce or eliminate a detonating effect;
- ergonomically placed outlets for connecting mechanical parts that transmit the mechanical power and guaranteeing easy actuator installation next to walls;
- outlets for connecting at least one of the electric supply and control connections, wherein the outlets are positioned so they do not interfere with the wiring resistance by kinking and stretching the electrical wiring;
- an angular-operating actuator in which the motion is transmitted directly to an external user via an intermediate connection shaft and a reducer shaft located in the housing.

The above and other objects and advantages of the invention, as will appear from the following description, are obtained by an actuator as claimed in claim 1. Preferred embodiments and non-trivial variations of the present invention are claimed in the dependent claims.

BRIEF DESCRIPTION OF THE DRAWINGS

The present invention is described below with reference to some preferred embodiments. These embodiments are given as non-limiting examples with reference to the enclosed drawings. In the drawings.

DETAILED DESCRIPTION

Figure 1:
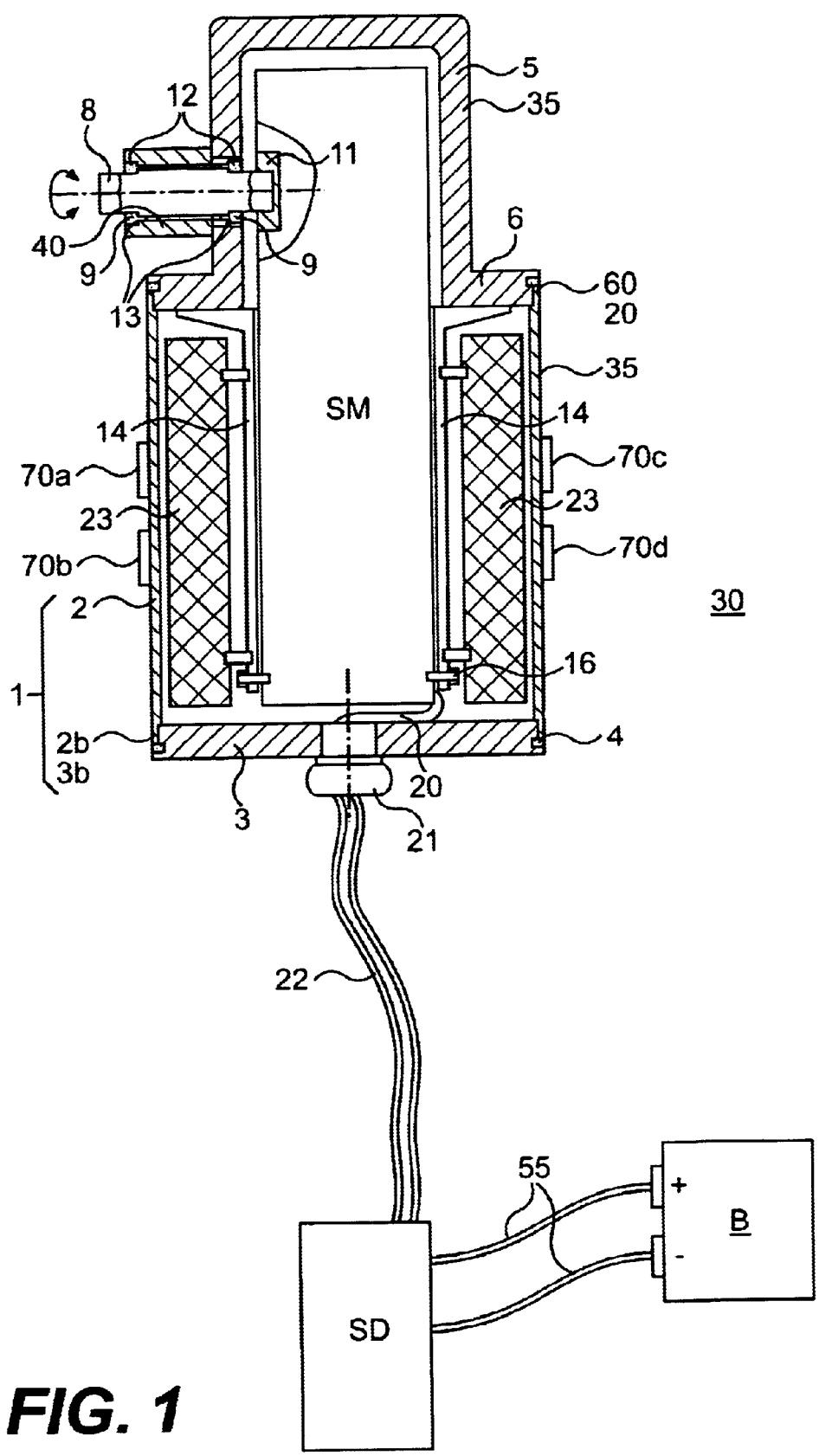
FIG. 1 is a schematic side view of an anti-deflagrating operating actuator of the angularly operating type consistent with methods and systems of the present invention.

An angular operating actuator 30, as shown in FIG. 1, includes a housing 35 having a plug 3, a sealing ring 4, an upper half-shell 5, a treaded flange 6, a pin 8, rolling bearings 9, securing rings 12, rings 13, brackets 14, threaded pins 16, electric wiring 20, a cable pressing device 21, a cable section 22, outlets 70a–70d, and a servomotor SM.

Housing 35 includes a lower half-shell 1 and an upper half-shell 5. Lower half-shell 1 is formed on a lower portion of housing 35 and includes a cylindrical mantle 2. Cylindrical mantle 2 is smooth and free from interruptions, and is equipped at both eds with internal threading sections 2a and 2b of adequate lengths, respectively.

The lower end of cylindrical mantle 2 having internal threading section 2b, is closed by a plug 3. Plug 3 is of a suitable thickness (s3) that is able to withstand, without distortions, a deflagration-induced force or a design pressure to which actuator 30 is subjected. Plug 3 provides at least one hole used for connecting electric wiring 20 or other related connections. Sealing ring 4 is placed next to internal threading section 2b. Alternatively, actuator 30 may be configured so that cylindrical mantle 2 is integrated with plug 3. This alternative configuration does not, however, use internal threading section 2b. Both cylindrical mantle 2 and plug 3 comprise an aluminum alloy melt used, for example, in making shell casts.

Upper half-shell 5 is an upper portion of actuator housing 35, and is also made of an aluminum alloy melt used, for example, in making shell casts. Upper half-shell 5 couples with lower half-shell 1 through threaded flange 6. Threaded flange 6 includes an external threading 6a and is used to support servomotor SM.

A plane section of the side surface of upper half-shell 5 includes a threaded through hole 45. A cynical sleeve 40 is very thick and coupled to upper half-shell 5 via threaded through hole 45, and a sealing ring (not shown).

Cylindrical sleeve 40 is connected to pin 8. Pin 8 is made of stainless steel and transmits twisting torque through rolling bearings 9, which are arranged on two opposite ends of sleeve 40, respectively. Rolling bearings 9 have suitable coupling tolerances and are secured through resilient rings 12. Rolling bearings 9, ensure that stainless steel pin 8 is positioned along a central axis. Rolling bearings 9 are further able to withstand any loads to which pin 8 is subjected. The positioning of pin 8 is further secured via rings 13, which are located on pin 8 between pin 8 and sleeve 40.

Pin 8 is equipped with a prism shaped seat 11, which is set in a prism shaped groove integrated into servomotor SM. As a result, pin 8 is adapted to transfer twisting torque to servomotor SM.

Servomotor SM is secured to threaded flange 6 by aligning the outlet axis of servomotor SM with the transmission axis of pin 8. Threaded flange 6 is equipped with a suitable groove for sliding the body of servometer SM along the outlet axis. Brackets 14 are integral with flange 6 and enable a secure coupling between servomotor SM and upper half-shell 5. Brackets 14 include through holes on each end respectively, that enable coupling to threaded pins 16 integrated on servomotor SM. Once servomotor SM is coupled to flange 6, lower half-shell 1 is coupled to half-shell 5 via external threading 6a. Moreover, plug 3 is coupled to half-shell 1 via internal threading 2b. Electric connection cable 20 is secured to cable pressing device 21 having an anti-deflagraing securing ring nut. Electric cable section 22 connects the actuator to a switch SD, which is enclosed in a metallic tear-preventing sheath coated with polyvinyl chloride (PVC) and a mechanical seal (not shown). Alternatively, brackets 14 may be permanently integrated with flange 6 via a melting process of an aluminum alloy shell used,.for example, in making shell casts.

Outlets 70a–70d facilitate the connection of at least one of an electrical power supply and control connections to actuator 30. Outlets 70–70d are strategically located in ergonomic positions on housing 35, to enable actuator 30 to be located near walls.

Battery B supplies electric power to actuator 30 via switch SD. Electrical cabling 55 connects battery B to actuator 30. Switch SD facilitates the transmission of electrical power to actuator 30, and in particular, to servomotor SM via electric cable section 22. By opening or closing a circuit (not shown) contained therein, switch SD enables battery B to provide electrical power to actuator 30.

Lower half-shell 1 and upper half-shell 5 comprise actuator housing 35. Volume material 23 is contained in a non-uniform area of actuator housing 35 located adjacent to brackets located on either side of servomotor SM. Volume material 23 optimizes the dynamic response of actuator 30 resulting from deflagrations. Volume material 23, thus enables monitoring of an explosion that is external to actuator housing 35. Explosion monitoring is realized because the level of denseness of volume material 23 is above a threshold at which uncontrolled detonation phenomena occurs.

Figure 2:
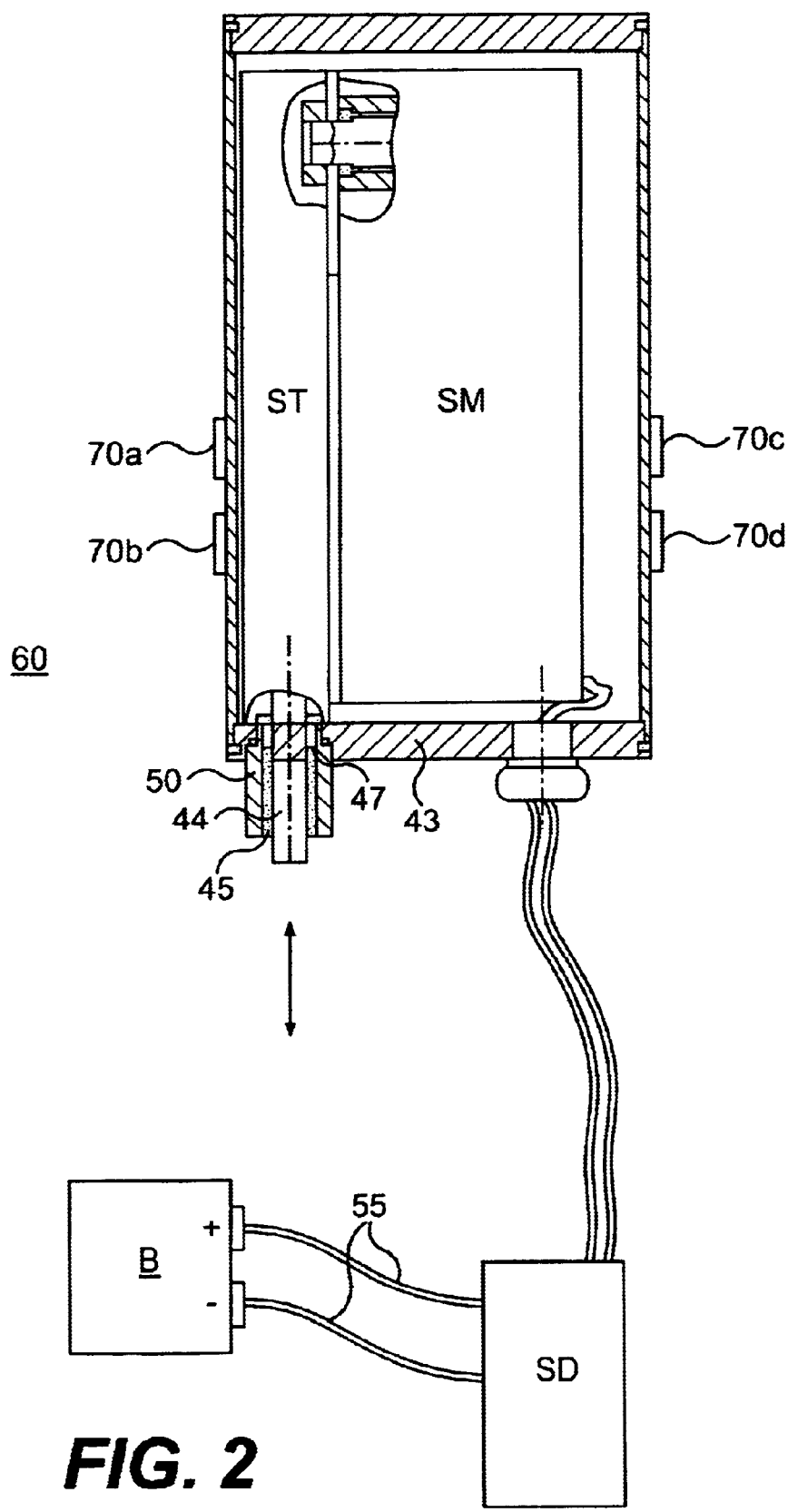
FIG. 2 is a schematic side view of an anti-deflagrating operating actuator of the linearly operating type consistent with methods and systems of the present invention.

FIG. 2 illustrates a linearly operating actuator 60 consistent with methods and systems of the present invention. In addition to the components of actuator 30 illustrated in FIG. 1, linearly operating actuator 60 includes a box ST, a cylindrical sleeve 50, a flange 43, a pin 44, sliding bearings 45, a threaded through hole 47, and outlets 70a–70d. Box ST is located adjacent to servomotor SM, and transforms rotary motion into linear motion. Box ST is coupled to servomotor SM via pin 8.

A plane section of flange 43 includes threaded tough hole 47. Cylindrical sleeve 50 is very thick and coupled to flange 43 via threaded trough bole. Cylindrical sleeve 50 is connected to stainless steel pin 44. Sliding bearings 45 are arranged on opposite sides of cylindrical sleeve 50 and ensure that pin 44 is positioned along a central axis. Sliding bearings 45 further enable box ST to transform rotary motion of input via pin 44 into a linear motion at pin 8.

As mentioned above, each of actuators 30 and 60 as illustrated in FIGS. 1 and 2, respectively, further include outlets 70a–70d that are ergonomically positioned on their respective housings so that actuators 30 and 60 may be installed next to walls Outlets 70a–70d are used to connect external mechanical components used for transmitting mechanical power, and at least one of electric supply and control connections so that wiring efficiency is not impaired due to kinking and stretching of the electrical wiring in actuator 60, the rotary or angular motion is directly output to an external user on pin 44 through an intermediate connection realized via a reducer shaft (not shown) contained within actuator housing 65. A simplified actuator is, therefore, realized, which obviates the use of a number of intermediate linear motion transmission mechanisms seen in conventional devices.

FIGS. 1 and 2, illustrate simplified actuators with regards to the number of transmission components that are used. These simplified actuators 30 and 60 operate without intermediate linear motion transmission mechanisms such as a rack, which is widely used in conventional devices.

As shown in FIG. 1, threaded couplings 2a–6a and 2b–3b are located between cylindrical mantle 2 and flange 6, and cylindrical mantle 2 and circular plug 3 respectively. Threaded coupling 2a–2b has a left-handed lading SN (not shown) and threaded coupling 2b–3b has a right-handed threading DS (not shown). Threaded couplings 2a–6a and 2b–3b enable the assemblage of half-shells 1 and 5 into housing 35, for example, by rotating cylindrical mantle 2 with respect to flange 6 and plug 3 while avoiding wiring impairment through kinking and stretching. In this manner, the actuator assembly can comply with a simplified procedure divided into several mechanical and automatic steps, which are performed without confronting unidirectional threaded elements. This actuator assembly may be used with simple rotation steps of the cylindrical trunk and the translation of plugs 3 and 43, respectively.

What is claimed is:

1. An anti-deflagrating operating actuator, integrally protected against deflagration and having an external protection housing that is formed in a shape that outlines internal parts of the actuator, said actuator comprising:

an upper half shelf including a flange;

a lower half shell including a cylindrical mantle and a circular plug;

a first threaded coupling having left-handed threading located between the cylindrical mantle and the flange; and a second threaded coupling having right-handed threading located between the cylindrical mantle and the circular plug.

2. A method of assembling the anti-deflagrating actuator of claim 1, comprising the steps of:

engaging a left-handed threading of the cylindrical mantle with a left-handed threading of the flange;

engaging a right-handed threading of the cylindrical mantle with a right-handed threading of the circular plug; and rotating the cylindrical mantle relative to the flange and to the circular plug.

* * * * *